United States Patent

[11] 3,633,852

[72] Inventors David Forman
Centerport;
Angelo C. Scandalis, Northport, both of N.Y.
[21] Appl. No. 24,281
[22] Filed Mar. 31, 1970
[45] Patented Jan. 11, 1972
[73] Assignee Fairchild Hiller Corportion
Montgomery County, Md.

[54] AIRCRAFT SEAT EJECTION SAFETY SYSTEM
10 Claims, 5 Drawing Figs.
[52] U.S. Cl. ................................................ 244/122 A
[51] Int. Cl. ................................................ B64d 25/10
[50] Field of Search ........................................ 244/122, 122.15, 122.11

[56] References Cited
UNITED STATES PATENTS
2,924,406  2/1960  Hildebrand et al. ..........  244/122

Primary Examiner—Milton Buchler
Assistant Examiner—Carl A. Rutledge
Attorney—Michael W. York ABSTRACT: An aircraft seat ejection safety system for aircraft ejection seats that have an ejection-actuating arm on each side of the ejection seat that includes a locking mechanism on the ejection-actuating arms for permitting the ejection-actuating arms to be secured in their inoperative positions until one of the locking mechanisms is manually released and a member that interconnects the locking mechanisms and hold the ejection-actuating arms in their inoperative positions until the manual release of one of the locking mechanisms. The locking mechanism includes a manually operable lever for releasing the locking mechanism and a manually operable safety mechanism is also provided that normally prevents the manually operable lever from being operated.

PATENTED JAN 11 1972

INVENTORS
David Forman
Angelo C. Scandalis
BY Michael W. York
Attorney

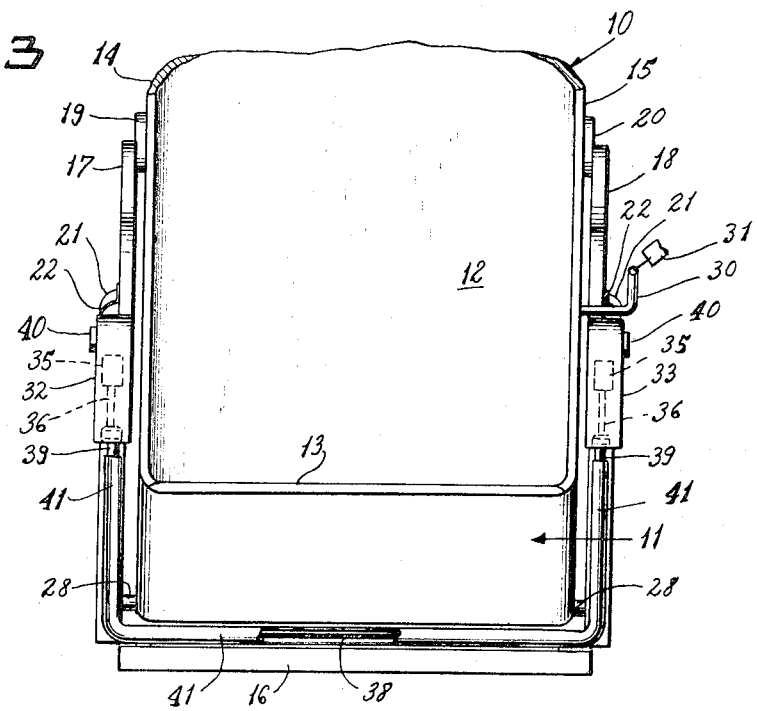
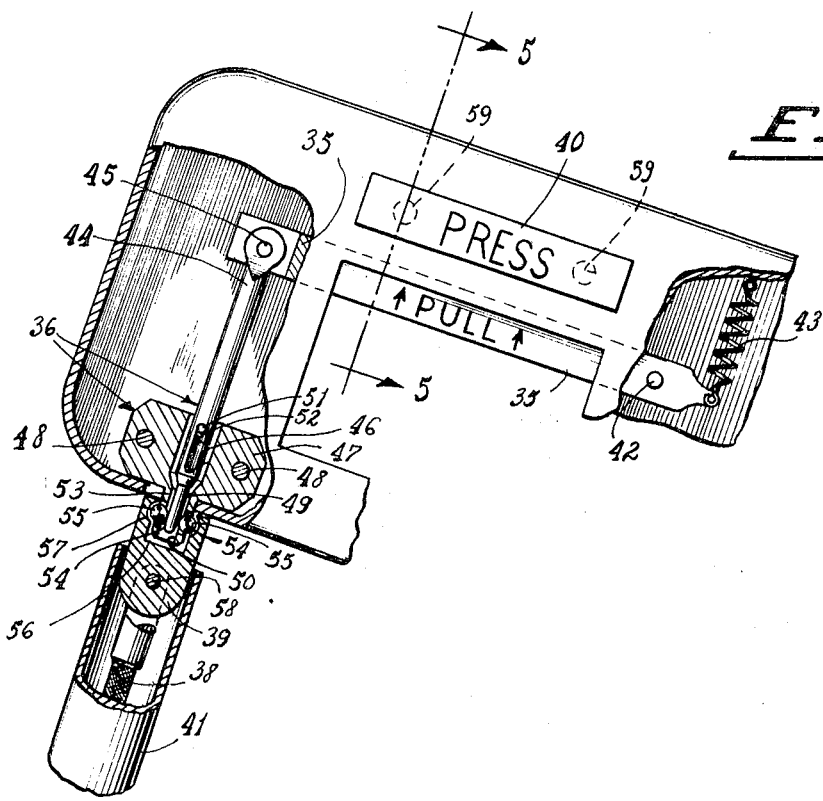

AIRCRAFT SEAT EJECTION SAFETY SYSTEM

This invention relates to aircraft seat ejection systems and more particularly to an aircraft seat ejection safety system that permits rapid activation of the ejection system and uses safety mechanisms to prevent the accidental activation of the ejection system.

Modern high-performance aircraft require an escape system that permits the airman to rapidly eject from the aircraft in the event the aircraft and the airman are endangered due to damage or malfunction of the aircraft. One well-known escape system utilizes an explosive or a propellent charge that projects or fires the aircraft seat and the airman in the seat out of the aircraft. In this type of ejection system, it is important that the system be easily activated when necessary by the airman and it is also important for the system to have safety features that prevent or greatly reduce the possibility of accidental system initiation.

Rapid activation of the aircraft seat ejection system has been provided for in the past by the use of an actuating or activating arm or lever located on each side of the ejection seat. These activating arms are connected in such a manner that the raising of either one of the arms or both of them results in activation of the system. In view of this arrangement, the airman is capable of rapidly activating the seat ejection system through the use of either hand or both of his hands. In view of the ease in which this system is activated, one of the major problems with this type of conventional system is that of providing a positive safety feature that would prevent inadvertent activation. Since this type of system can be activated by either arm, some provision is necessary that will prevent accidental activation of either arm; however, such provisions as individual unconnected safety locks on each arm are not entirely acceptable since they increase the time that it takes to activate the system.

In the past there has not been a satisfactory positive automatic safety system that would provide ground maintenance personnel with a safe-to-handle armed ejection seat. Most prior activation systems have required the manual insertion of safety pins in the actuating mechanism to protect personnel during the routine handling of the armed ejection seat and during normal maintenance work in the aircraft cockpit. Unfortunately, these procedures have the disadvantage of relying on human memory for the disarming of the activating system and for the rearming of the system prior to aircraft flight.

The aircraft seat ejection safety system of the invention overcomes these disadvantages and provides a safety system for an aircraft seat ejection actuating system that includes a positive safety system that permits rapid activation of the ejection system.

It is therefore an object of the present invention to provide an aircraft seat ejection safety system that reduces the possibility of accidental activation or actuation of the aircraft seat ejection system.

It is an object of the present invention to provide an aircraft seat ejection safety system that permits the safe performance of normal ground maintenance in the cockpit of the aircraft.

It is also an object of the present invention to provide an aircraft seat ejection safety system that permits rapid activation of the aircraft seat ejection system.

The present invention provides an aircraft seat ejection safety system for aircraft ejection seats that have an ejection actuating arm located on each side of the ejection seat including locking means on the ejection-actuating arms for permitting the ejection-actuating arms to be secured in their inoperative positions until one of the locking means is released and connecting means connected to the locking means for interconnecting the locking means and for holding the actuating arms in their inoperative positions until the release of one of the locking means.

In order that the invention may be more clearly set forth and better understood, reference is made to the drawings in which:

FIG. 4 is an enlarged broken view of a portion of the handle of the ejection arm of the structure illustrated in FIG. 1 taken within the circle 4 thereof; and FIG. 5 is a sectional view of a portion of the structure illustrated in FIG. 4 taken along the line 5—5 thereof.

Figure 1:
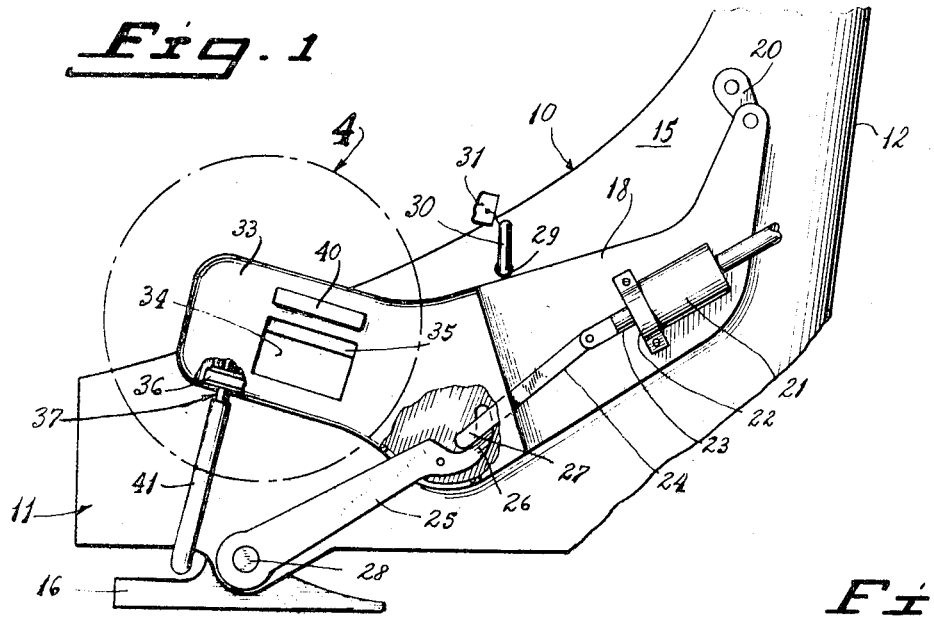
FIG. 1 is a side elevational view of a portion of an aircraft ejection seat with an aircraft seat ejection activating system embodying the features of the present invention showing the ejection-actuating arms locked in their inoperative positions.
Figure 2:
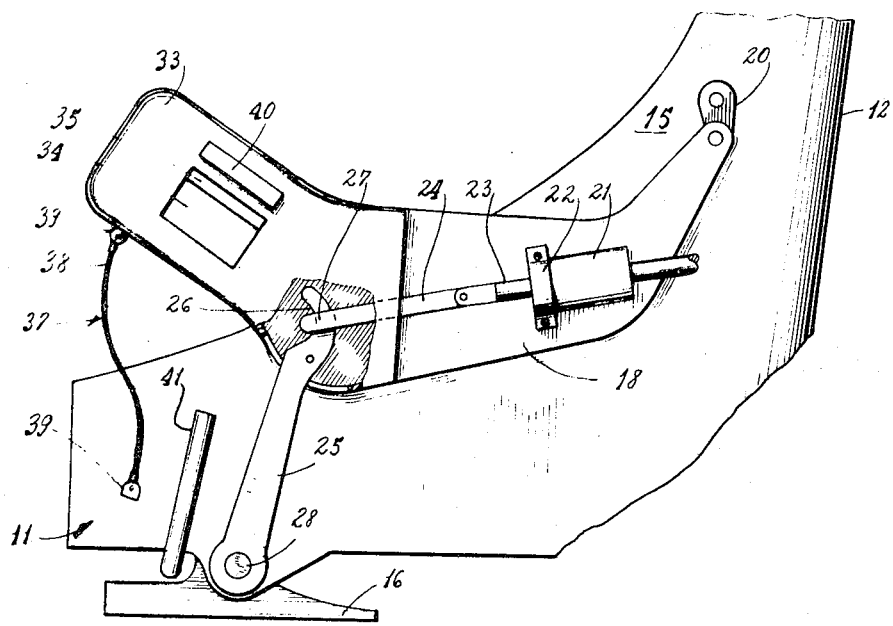
FIG. 2 is a side elevational view of the aircraft ejection seat shown in FIG. 1 with the ejection-actuating arms in their ejection position.
Figure 3:
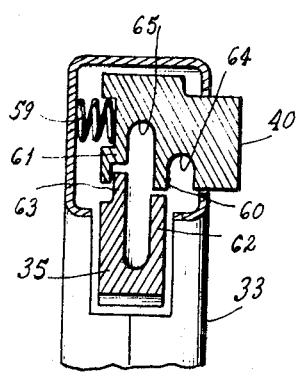
FIG. 3 is a front elevational view of the structure illustrated in FIG. 1.

Referring to FIGS. 1 through 3 there is shown a major portion of an aircraft ejection seat 10 embodying the features of the present invention. The ejection seat 10 comprises a seat bucket 11 that includes a seat back 12, a seat bottom 13 and right and left side panels 14 and 15 that are located on each side of and are attached to the seat bottom and seat back. A leg restraint 16 that moves downward and forward upon ejection to prevent rearward leg travel is attached to the underside of the seat bucket 11. Right and left ejection seat actuating arms 17 and 18 are pivotally connected to the respective right and left side panels 14 and 15 by means of the respective links 19 and 20 that are rotatably connected to the respective side panels and the respective actuating arms. Ejection seat initiators 21 are secured to the outside aft portion of the ejection-actuating arms 17 and 18 by means of the initiator integral mounting brackets 22. The initiators 21 have integral loaded plungers 23 that are normally held by spring action in their inward positions that serve to activate the initiators when the plungers are pulled outward. An ejection control link 24 is pivotally connected at one end to each spring-loaded plunger 23 and at the opposite end to an ejection trigger arm 25 that has a finger 26 that fits within an eyelet 27 on the opposite end of the ejection control link. Each ejection trigger arm 25 is pivotally connected at its lower end to the side of the seat bucket 11 and is rotatably connected to the appropriate ejection seat actuating arm 17 or 18 at a point that is just below the finger 26 so that the upward movement of the ejection-actuating arms causes the ejection trigger arms to pivot upwardly about their lower ends so that the fingers pull the ejection control links 24 forward which results in the initiator plungers 22 being pulled outward to activate the initiators 21. Each ejection trigger arm 25 is rigidly mounted on one end of a shaft 28 that extends completely through the seat bucket 11 and protrudes outside the left and right side panels 14 and 15. The shaft 28 is free to rotate about its long axis within the bucket 11 so that the raising of one ejection arm and the corresponding rotation of its trigger arm 25 causes the rotation of the other trigger arm on the other side of the seat and the upward movement of the other ejection arm.

For performing normal ground maintenance and in order to prevent the accidental raising of the actuating arms 17 and 18 when the ejection seat 10 is not in use, a safety pin hole 29 is located in the left side panel 15 at a point above the ejection actuating arm 18 when the arm is secured in its downward position. A safety pin 30 having an attached flag 31 is insertable into this hole to block upward movement of the ejection arm 18 and thus prevent either actuating arm from being raised until the safety pin is removed since the actuating arms are interconnected by the shaft 28. The flag 31 on the safety pin 30 provides a means of giving a visual warning that the safety pin is installed so that it is unlikely that a safety pin will be overlooked and left in when the ejection seat is being put into operation. In a similar manner the lack of the flag 31 indicates that a safety pin is missing and that it should be inserted if the ejection seat is not to be utilized.

Located on the forward ends of the ejection seat actuating arms 17 and 18 are respective substantially identical right and left handles 32 and 33 that have an opening 34 that permits the airman to insert his fingers and grasp the handle. Locking means for permitting the ejection-actuating arms to be secured in their inoperative positions until one of the locking means is manually released are located on the handles 32 and 33 of the respective actuating arms 17 and 18. The locking means comprises a manually operable lever 35 and releasing means connected to the manually operable lever comprising a ball lock system 36. Connecting means comprising an elongated flexible member 37 is connected to the ball lock systems 36 of the locking means for holding the ejection-actuating arms 17 and 18 in their inoperative positions until one of the locking means is manually released. The elongated flexible member 37 comprises a cable 38 having cable locking members 39 attached to each of its ends. Safety means comprising a manually operable press bar 40 is located on each handle 32 and 33 of the respective actuating arms 17 and 18 for normally preventing the manually operable levers 35 from being operated. A guide member 41 surrounds a substantial portion of the cable 38 and is connected to the seat bucket 11. The guide member 41 comprises a U-shaped tube disposed about the bottom and sides of the ejection seat 10. The cable 38 is free to move within the guide member 41. The guide member 41 serves as a guide for the cable 38 and prevents the cable from catching on the seat 10 or some other object.

The details of the locking means on the handles 32 and 33 of the respective actuating arms 17 and 18 that permit the activating arms to be secured in their inoperative positions until one of the locking means is manually released are illustrated in FIG. 4. The locking means comprises the manually operable lever 35 that pivots about pivot pin 42 and is biased in the downward direction by the lever spring 43 that is connected to the rear of the lever and to the appropriate ejection seat actuating arm 17 or 18, and the ball lock system 36 that is connected to the forward end of the lever. The ball lock system includes a ball lock pin 44 that is rotatably connected at its upper end to the forward end of each manually operable lever 35 by pin 45. A lower portion of each ball lock pin 44 rides within a hole 46 in a ball lock housing 47 that forms part of the ball lock system and the housing is secured to the appropriate actuating arm 17 or 18 by rivets 48. A projection 49 on the lower end of each ball lock pin 44 rides within a hole 50 in the ball lock housing that is concentric with the hole 46 and each ball lock pin is slidably mounted to the ball lock housing by means of the pin 51 that is connected to the housing and rides within a slot 52 in the ball lock pin.

Each ball lock housing has a cylindrical projection 53 that has two ball-receiving holes 54 that extend from the hole 50 in the ball lock housing to the outside of the cylindrical projection. Two balls 55 that form part of the ball lock system are provided in the ball-receiving holes 54 that are adapted to be forced outward when the projection 49 on the ball lock pin 44 is in its downward position. When the projection 49 is in its downward position, a portion of each ball 55 extends beyond the outside surface of the cylindrical projection 53. The cable-locking members 39 that are connected to each end of the cable 38 each have a hole 56 in their upper end that is adapted to receive the cylindrical projections 53 that are located on the lower end of the ball lock housings 47. A circular recess 57 is located in the inner surface of the hole 56 in the locking members 39 that is adapted to receive a portion of each ball 55 when the cable locking members 39 are slipped over the projections 53 and the ball lock pins 44 are in their downward positions.

When both manually operable levers 35 located on the handles 32 and 33 of the respective right and left actuating arms 17 and 18 are not operated by being pulled upward they are biased in a downward direction by the lever springs 43 and this forces the associated ball lock pin 44 into its downward position so that the projection 49 on the pin forces the balls 55 that ride in the ball-receiving holes 54 in an outward direction so that they engaged the circular recess 57 located on the inner surface of each locking member 39 and this securely locks the ball lock mechanisms 36 that are connected to the respective actuating arms 17 and 18 to the locking members. Each end of the cable 38 is also securely fastened to the respective locking member 39 by a pin 58, therefore, the actuating arms 17 and 18 cannot be raised since the cable 38 holds them in a downward position.

After the actuating arms 17 and 18 have been placed in a downward position and the balls 55 are forced outward by the projection 49 to engage the circular recess 57 in the cable-locking members 39 so that the actuating arms are locked to the cable 38, when either one or both of the manually operable levers 35 on the handles 32 and 33 are operated by being pulled upward the ball lock pin 44 that is connected to the lever that is operated is pulled in an upward direction and consequently the projection 49 on the pin no longer forces the balls 55 in an outward direction. Thus the balls 55 are no longer forced to engage the circular recess 57 located in the inner surface of the locking member 39 that was connected to the ball lock system that is attached to the lever that was operated. Consequently, neither one of the handles 32 or 33 is secured in a downward position and either handle can be manually raised to activate the ejection system since the locking member 39 on the end of the cable 38 is no longer secured to the ball locking housing 47 that is connected to the actuating arm that has the lever 35 that has been operated. When the actuating arms are raised, if only one lever is operated, the cable 38 is pulled through the guide member 41 since one end of the cable is still attached to the ball lock housing that is connected to the actuating arm that has the lever that has not been operated.

As best illustrated in FIG. 5, the press bar 40 projects on the outside of the handles 32 and 33 and is biased in an outwardly direction by coil springs 59 that are located between the inside of the handle and the press bar. The press bar 40 has projections 60 and 61 located on its lower inside surface that normally contact the upper edges of the flanges 62 and 63 of the lever 35 and prevent it from moving in an upward direction when the press bar is biased in its outward position. The press bar has slots 64 and 65 that are adapted to receive respectively the upper ends of the outer flange 62 and the inner flange 63 of the lever 35 and permit the lever to be moved in an upward direction after the press bar has been pressed inward.

In order to activate the aircraft ejection seat embodying the present invention under operating conditions after the safety pin 30 has been removed, the airman merely inserts his fingers into the opening 34 in one of the handles 32 or 33 and while grasping the handle pulls in an upward direction with his fingers against the manually operable lever 35. When the airman grasps the handle 32 or 33 and pulls upward on the lever 35 the palm of his hand will almost automatically depress the press bar 40 and this will result in the projections 60 and 61 that normally block the upward movement of the lever being pushed inward so that the lever is pulled upward by the airman's fingers and the outer flange 62 and the inner flange 63 of the lever are pushed into the respective slots 64 and 65 in the press bar. As the lever 35 is pulled upward the attached ball lock pin 44 is raised which allows the two balls 55 to recess into the ball lock housing 47 so that separation can occur between ball lock housing and the cable lock 39 thereby allowing the handles 32 and 33 to be moved upward for initiating seat ejection.

Although this aircraft seat ejection safety system is easy to release by the airman through the use of one or both of his hands it is very difficult to accidentally release the safety system since both an inward force on the press bar 40 and an upward force on the lever 35 are required before the ejection seat can be activated. Consequently, the ejection seat cannot be activated even though the press bar is accidentally struck or even though something catches on the lever and pulls it upward unless these two events occurred substantially simultaneously which is highly unlikely.

Although the invention has been described in considerable detail with reference to certain preferred embodiments, it will be understood that variations and modifications may be made within the spirit and scope of the invention as defined in the appended claims.

What is claimed is:

1. In an aircraft ejection seat having an activating system that has an ejection-actuating arm located on each side of the ejection seat, locking means on said ejection-actuating arms for permitting said ejection-actuating arms to be secured in their inoperative positions until one of said locking means is released and connecting means connected to said locking means for interconnecting said locking means and for holding said ejection-actuating arms in their inoperative positions until the release of one of said locking means.

2. The apparatus as recited in claim 1 wherein said locking means comprises a manually operable lever and releasing means connected to said manually operable lever and said connecting means for releasing said connecting means when said manually operable lever is operated.

3. The apparatus as recited in claim 2 wherein said releasing means comprises a ball lock system.

4. The apparatus as recited in claim 2 including safety means on said ejection-actuating arms for normally preventing said manually operable lever from being operated.

5. The apparatus as recited in claim 4 wherein said safety means comprises a manually operable press bar.

6. The apparatus as recited in claim 1 wherein said connecting means comprises an elongated flexible member.

7. The apparatus as recited in claim 6 wherein said elongated flexible member comprises a cable.

8. The apparatus as recited in claim 6 including a member surrounding a substantial portion of said elongated flexible member.

9. The apparatus as recited in claim 8 wherein said member that surrounds said elongated member comprises a U-shaped tube disposed about the bottom and sides of said ejection seat.

10. Aircraft ejection apparatus comprising an ejection seat, an ejection-actuating arm located on each side of the ejection seat, locking means on the forward portion of each ejection-actuating arm for permitting said ejection-actuating arms to be secured in their inoperative positions until one of said locking means is released, said locking means comprising a manually operable lever and releasing means connected to said manually operable lever, connecting means connected to said releasing means for interconnecting said releasing means and for holding said ejection-actuating arms in their inoperative positions until one of said manually operable levers is operated to cause the connected releasing means to release said connecting means, and safety means on each ejection-actuating arm for normally preventing said manually operable levers from being operated.

* * * * *